_United States Patent Office_

3,189,581
Patented June 15, 1965

3,189,581
PRESSURE SENSITIVE ADHESIVES COMPRISING INTERPOLYMERS OF ALKYLACRYLATES, VINYL ESTERS AND N-ALKOXYALKYL ACRYLAMIDES
Donald P. Hart, Allison Park, and Roger M. Christenson, Gibsonia, Pa., assignors to Pittsburgh Plate Glass Company, Pittsburgh, Pa., a corporation of Pennsylvania
No Drawing. Filed June 5, 1961, Ser. No. 114,599
11 Claims. (Cl. 260—80.5)

This invention relates to a pressure-sensitive adhesive composition. Particularly this invention relates to a pressure sensitive adhesive having good cohesive strength and resistance to "cold flow" over a large temperature range.

The invention is characterized by a composition comprising an interpolymer comprising from about 40 percent to about 99.9 percent of at least one compound having the formula:

(I) 

wherein R is an alkyl radical having at least 4 carbon atoms, up to 60 percent of a compound having the formula:

(II) 

wherein $R^1$ is a member of the group consisting of an alkyl radical having from 1 to 5 carbon atoms and an aryl radical and from about 0.1 percent to about 5.0 percent by weight of an N-alkoxyalkyl substituted unsaturated carboxylic acid amide.

Pressure-sensitive adhesives, which are normally used in the form of adhesive tapes or veneers and wallpapers, have recently attained considerable industrial importance; and production of these materials is continuing to increase as new uses are being found.

Their function is to provide instantaneous adhesion when applied under light pressure, and most applications further require that they can be cleanly removed from the surface to which they have been applied by a light pull. They are characterized by having a built-in capacity to secure this instantaneous adhesion to a surface without activation, such as treatment with solvents or heat, and also by having sufficient internal strength so that the adhesive material will not rupture before the bond between the adhesive material and the surface ruptures. The capacity to obtain instantaneous adhesion is usually expressed as the amount of "tack" or "tackiness."

Ordinarily it is desirable to obtain as much tack as possible without losing a significant amount of internal strength (cohesion). One very simple test which may be used to evaluate materials which are to be used as a pressure-sensitive adhesive comprises coating a backing with the material and folding the adhesive surface against itself until there is a bond obtained between the two surfaces of adhesive material. The two surfaces are then pulled apart. The adhesive is then observed for the degree of "leg," that is the distance the adhesive material extends from the backing before the two surfaces part. If the "leg" is too great, the adhesive lacks sufficient internal strength. Extreme "leg" is manifested by the formation of "spiderweb-like" fibers bridging the two surfaces.

The adhesive coating which is applied to the backing material should have in addition to permanent tack and adhesiveness, internal strength (cohesiveness), resilience, cushioning power, and usefulness over a wide range of temperatures. In order to obtain all of these qualities, it has been necsesary to make these pressure-sensitive adhesives from several components and additives, since no single compound or known composition was found to have all of the qualities which are necessary for a material to function as a pressure-sensitive adhesive. Polyisobutylene and the polyvinyl ethers have been used extensively as pressure-sensitive adhesives, but it has been found necessary in most instances to incorporate certain additives to impart tack, adhesion and wetting power to these materials; mixtures of more than one molecular weight polymer have been used.

A wide variety of backing materials are used for these tapes and the intended application usually determine which type of backing is selected. For example, 80 x 80 cotton cloth is frequently selected for surgical tapes; vinyl film, acetate rayon and fiber-glass cloths are often used in the electrical industry; silk is used in the photographic industry; cellophane and cellulose acetate films are usually used in transparent tapes; paper which has been impregnated with rubber, protein or resins is used in masking tapes; and vinyl films, particularly vinyl chloride films, are used for making veneers or other decorative coverings. Metal foils have also been used with pressure-sensitive tapes and have shown considerable promise in this application.

In many applications it is desired to remove the pressure-sensitive adhesive coated backing from the surface to which it has been applied. Often deposits of the adhesive material are left on the surface after removal and must be removed with a solvent or other means. In addition to leaving an unsightly and dirtied surface, the loss of the adhesive material necessarily limits the reuse of the adhesive coated backing material. As the temperature of the contacted surface is increased the tackiness of the adhesive material increases and the cohesive strength decreases, with the result that a greater amount of adhesive material is deposited at elevated temperatures. Many adhesive materials which have extremely good adhesive strength at normal temperatures and low temperatures lose this cohesive strength at elevated temperatures and are therefore restricted from use at these elevated temperature applications. Examples of areas of utility which demand an adhesive material which may be used at elevated temperatures are electrical insulations and electrical wiring tapes, thermal insulations which may be used to cover forced air heating ducts, hot water pipes or tanks, roofing materials, decorative veneers which are to be used on or near lighting fixtures and any other applications which may necessitate contact with heated objects.

Another feature which is desirable in the use of pressure-sensitive adhesive compositions is the resistance to "cold flow." When a backing is applied under pressure to a surface there is a tendency of many adhesive compositions to migrate to certain areas having less pressure, or when the backing is a surgical type for use on skin, the constant working of the skin causes the migration of many adhesives. The results of this migration or "cold flow" is the formation of concentrations of the adhesive as isolated masses.

It has now been discovered that a material which has all of the properties necessary for use as a pressure-sensitive adhesive (including "cold flow" resistance) and which maintains these properties at elevated temperatures (300° F. or higher) can be obtained by copolymerizing a small amount (0.1 percent to about 5 percent by weight) of a compound represented by the formula:

(III) 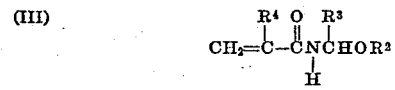

wherein $R^2$ is a lower alkyl radical having from 1 to 18 carbon atoms, $R^3$ is a member selected from the group consisting of hydrogen, aryl, a lower alkyl radical having from 1 to 6 carbon atoms and a furyl radical and $R^4$ is hydrogen or a methyl radical, with a compound represented by Formula I and a compound represented by Formula II in the above-mentioned range of proportions.

The preparation of the compositions of the instant invention may be effected in a solvent medium according to the method outlined in copending application Serial No. 82,160, filed January 12, 1961, and now abandoned, or they may be prepared in an emulsion medium.

A typical procedure which may be used to prepare the compounds represented by Formula III involves dissolving the unsaturated carboxylic acid amide in an alcohol and adding the resulting solution to a solution of the alcohol and desired aldehyde, preferably formaldehyde, the latter solution including a polymerization inhibitor such as a quaternary ammonium salt, an amine or a hydroxy aryl compound such as hydroquinone. The resulting mixture is then refluxed and after the reaction is substantially complete the reaction mixture is washed by water, the alcohol is removed by distillation, as is a dialkyl formal by-product which is formed.

Alternative methods of processing include removal of the water by azeotropic distillation or dispensing with the water washing followed by removal of the alcohol and dialkyl formal by distillation.

A typical preparation of the etherified aldehyde modified unsaturated carboxylic amides is set forth in the following example:

A mixture of 1065 grams of acrylamide, 2475 grams of butyl Formcel, 4500 grams of butanol, and 180 cubic centimeters (60 percent aqueous solution) of trimethylbenzyl ammonium chloride was refluxed at a temperature in the range of 100° C. to 105° C. for 3 hours, cooled and then filtered. The filtrate was washed three times with 3000 cubic centimeters of water, the aqueous layer discarded, and 1.2 grams of hydroquinone added to the solvent layer. The solvent was then removed by distillation at reduced pressures and 1518 grams (65 percent) of N-butoxy-methyl acrylamide was obtained. The product had a nitrogen content of 8.94 percent (theoretical value 8.92 percent), and an index refraction at 25° C. of 1.4629.

While the compounds represented by Formula I include all of the acrylates from butyl up to octadecyl and even higher, it is preferred that the acrylates which have been formed from alcohols having from 4 to 10 carbon atoms be used; examples of these acrylates include butyl, pentyl, hexyl, heptyl, 2-ethylhexyl-, octyl-, nonyl- and decyl-acrylate. Compounds represented by Formula II include the vinyl esters of acetic acid, propionic acid, butanoic acid, pentanoic acid; the vinyl ester of acetic acid, however being the preferred monomer. The acrylates must be present in amounts of at least 40 percent, however, it is preferred that they be present in amounts ranging from 40 percent to 99.9 percent by weight of the total polymer. Accordingly, the vinyl esters should be present in amounts ranging up to about 60 percent by weight of the total polymer.

Examples of the various etherified aldehyde modified unsaturated carboxylic amides defined by Formula III which may be used with the present invention include both the N-methylolated acrylamides and the N-methylolated methacrylamides which have etherified with a lower alkanol such as methanol, ethanol, propanol and butanol. These and many other aldehyde modified amides which are prepared according to the method outlined in copending application Serial No. 775,380, filed November 21, 1958, and now U.S. Patent No. 3,079,434, may advantageously be employed in the amounts within the above-mentioned range.

Because the butanol etherified aldehyde modified amides are water insoluble it is preferred that they be employed in emulsion polymerization techniques.

As previously mentioned, solution polymerization or emulsion polymerization may be employed. When either technique is to be used, certain controls must be maintained.

Because of the great diversity in polymerization rates, the compound represented by Formulas I and III may be added at a controlled rate to the compound represented by Formula II, or all of the reactive monomers may be added at a controlled rate to the reaction medium. One convenient method of preparation of the polymeric compositions by the solution method is to heat, while agitating, a solution of the compound represented by Formula II and add incrementally a solution containing the compounds represented for Formulas I and III with a solvent and a particular catalyst. In addition to controlling the amounts of the reactive monomers in the reaction medium, it is also important to maintain a rigid control over the solvent-to-monomer ratio; it is sometimes desirable that the polymerization be conducted in a solution medium having less than about 50 percent solvent as opposed to reactive monomers. It is possible, however, to vary the percent solvent over a large range. The solvents should not be of a nature which would result in excessive chain transfer.

The rate at which the acrylate may be added to the vinyl ester is contingent upon the weight proportions of the individual monomers, that is, the acrylate to the vinyl ester, and also to a great extent upon the variation of reaction rates among the various acrylates and among the various esters.

The temperature of reaction is governed by the solvent of the refluxing temperature of the emulsion, whichever is to be employed in the reaction. It is preferable that the solvent or solvent mixture be one that forms a medium with reactive monomers which refluxes below 120° C., but above 65° C. The reaction temperature governs the choice of catalyst which may be used for the reactions of the polymers of the instant invention. While benzoyl peroxide is the preferred catalyst for carrying out said reaction, any one of a variety of free radical catalysts which operate within the temperature range of about 65° C. to about 120° C. may be employed. Examples of such catalysts include tertiary butyl hydroperoxide, alpha, alpha-azo-bis isobutyronitrile, cumene hydroperoxide, di-tertiary butyl peroxide, and dicumyl peroxide.

The nature of the solvent system which is to be used with the resinous polymers of the instant invention may be varied in accordance wth the objective which is to be accomplished. While isopropyl acetate has the desirable quality of "biting" into many of the non-fibrous backing films, in order that the adhesive will adhere strongly to the backing, it is also advantageous at times to use straight aliphatic hydrocarbons which have no appreciable effect upon the non-fibrous backings, particularly polyvinyl chloride. These include straight chain aliphatic hydrocarbons and the cyclo-aliphatic hydrocarbons, such as cyclohexane and the like. In addition to the use of esters and aliphatic hydrocarbons, it is desirable to add a certain amount of a volatile solvent, such as the lower alkyl alcohols, acetone and the like. These volatile solvents are usually added after the polymerization is complete and are used to adjust the final solids content to a value between 20 and 50 percent of the total weight of the adhesive composition. It has been found that certain amounts (up to 10 percent by weight of the solvent) of a chain transfer agent, such as a lower alcohol or an aromatic compound, may be used with the solvent system to keep the molecular weight low enough so the polymer stays in solution.

When the emulsion method of polymerization is employed there is no problem of gelation during the polymerization and the minimum molecular weight needed for acquiring the necessary internal strength is easily obtained.

It should be noted that the resinous compositions of the instant invention are provided in a much higher solids content than many of the previously prepared pressure-sensitive adhesive compositions, particularly the polyvinyl ether adhesives which can be applied at solids concentration no higher than 15 to 20 percent. It is easily seen that when the composition must be marketed at low solids content (the adhesives are used on the backing at 100 percent solids) that their expense is prohibitive and when combined with the fact that many of these pressure-sensitive adhesives must be compounded from many different materials such as for instance the polyvinyl ether adhesives, that the single component high solids content adhesives of the instant invention provide a step forward in the art.

The resinous compositions of the instant invention are applied by roll coating, spraying, drawing, or doctor blade to almost any backing. Particularly useful are the non-fibrous backings, such as cellophane (regenerated cellulost), Mylar (terephthalic polyester), neoprene sheet (polychloroprene) and the various polyvinyl chloride materials such as, for example, Lustran. The adhesive is applied in a sufficiently thick coat so that after flashing the dry adhesive film is from ½ to 2 mils thick. The films are usually flashed for 30 to 60 seconds at a temperature ranging from 250° F. to about 300° F.

In addition to maintaining their desired properties and elevated temperatures, the pressure-sensitive adhesive compositions of the instant invention have good adhesion to the above-mentioned non-fibrous backings, wherein the smoothness of the uncoated surface makes adhesion of the adhesive material to the backing difficult. Because there is good adhesion between the adhesive material and the non-fibrous backings, there is no need to precoat the backing material on one side with a "primer" or a "subbing" coat to increase the affinity of the backing material for the pressure-sensitive adhesive material which is the case with many other adhesive compositions. Moreover, the adhesive materials which fall within the scope of the instant invention are composed of a single ingredient, that is, a copolymer made up of units as represented by Formulas I, II and III. Because of this fact, problems of migration or exudation of plasticizers from the adhesive material are not present and the additional cost of further compounding is eliminated. As mentioned above, these copolymers may also be applied from a composition having a high solids content (30 to 70 percent) and are therefore more economical than most other pressure-sensitive adhesive compositions. After application to the backing material, the solvent is removed and the pressure-sensitive adhesive materials are actually employed as a 100 percent solids composition.

The various products which may be prepared from the instant adhesives may be applied to hardboard, most kinds of plastics, metals, or almost any other surface which is not overly rough.

The resinous adhesive compositions of the instant invention are also particularly adaptable to be used on surgical tapes, etc., which may be applied without irritation to the skin.

The said adhesive compositions also find utility as a "bottled adhesive" which may be used directly on the surface of a large variety of materials, including paper and other various fibrous backings.

While various and sundry compositions are conceivable within the scope of the instant invention, the preparation and use of the preferred embodiments thereof are set forth in the following examples. All parts and percentages are by weight unless otherwise specified.

*Example I*

| Solution A: | Parts by weight |
|---|---|
| Vinyl acetate | 450 |
| 2-ethylhexyl acrylate | 1020 |
| N-butoxymethyl acrylamide | 30 |
| Ethyl acetate (99% pure) | 1250 |
| Solution B: | |
| Ethyl acetate (99% pure) | 250 |
| Benzoyl peroxide | 15 |

Into a reactor were charged 550 parts of solution A and 50 parts solution B. The reaction was purged with $N_2$ and refluxed for 10 minutes. The remainder of solution A and 150 parts of solution B were added dropwise to the reactor over a period of 2 hours. The remainder of solution B was then added to the reaction mass which was refluxed for 1½ more hours. A solution containing benzoyl peroxide (5 parts) and ethyl acetate (550 parts) was added dropwise to the reactor over a ½ hour period. The reaction mass was refluxed for one more hour to completion. The resulting product had the following properties:

| | |
|---|---|
| Solids (percent) | 42.3 |
| Viscosity (Gardner-Holdt) | $Z_2$ |

When the above composition is drawn down on Mylar sheet, cellophane, neoprene and 80 x 80 cotton cloth and flashed for 2 minutes at 300° F. there results a coating of a material having good initial tack which strongly adheres to these backings.

*Example II*

| Solution A: | Parts by weight |
|---|---|
| Vinyl acetate | 480 |
| 2-ethylhexyl acrylate | 1020 |
| Ethyl acetate (99% pure) | 1250 |
| Solution B: | |
| Ethyl acetate | 250 |
| Benzoyl peroxide | 15 |

Into a reactor were charged 550 parts of solution A and 50 parts of solution B. The reactor was purged with $N_2$ and refluxed for 10 minutes. The remainder of solution A and 150 parts of solution B were added dropwise to the reactor over a period of 2 hours. The remainder of solution B was then added to the reaction mass which was refluxed for 1½ more hours. A solution containing benzoyl peroxide (5 parts) and ethyl acetate (550 parts) was added dropwise to the reactor over a ½ hour period. The reaction mass was refluxed for one more hour to completion. The resulting product had the following properties:

| | |
|---|---|
| Solids (percent) | 42 |
| Viscosity (Gardner-Holdt) | $Z_3$ |

Films from I and II were drawn down on polyvinyl chloride sheets and baked at 300° F. for 2 minutes. After cooling to room temperature both films had equivalently good and acceptable tack. A Herculite glass panel was heated to 300° F. and the coated sheets were contacted thereto so that the adhesive formed a bond between the heated panel and the vinyl sheet. The coated sheets were then removed. The portion of the glass which came into contact with the adhesive material of Example I was perfectly clean and free from deposit while the portion of the glass which came in contact with the vinyl sheet coated with the adhesive material of Example II was substantially covered with a deposit of adhesive material of Example II.

*Example III*

| Solution A: | Parts by weight |
|---|---|
| 2-ethylhexyl acrylate | 1005.0 |
| Vinyl acetate | 487.5 |
| N-butoxymethyl acrylamide | 7.5 |
| Isopropyl acetate | 550.0 |
| Solution B: | |
| Isopropyl acetate | 250.0 |
| Benzoyl peroxide | 15.0 |

Into a reactor were charged 750 parts of solution A and 50 parts of solution B. The reactor was purged with $N_2$ and refluxed for 10 minutes. The remainder of solution A and 150 parts of solution B were added dropwise to the reactor over a period of 1 hour. The remainder of solution B was then added to the reaction mass which was refluxed for ½ hour and 550 parts of isopropyl acetate were added thereto. After ½ hour of reflux a solution containing benzoyl peroxide (5 parts) and isopropyl acetate (483 parts) was added. The reaction mass was refluxed for 2 more hours to completion. The resulting product had the following properties:

Solids (percent) _____ 44.3
Viscosity (Gardner-Holdt) _____ $Z_4$

*Example IV*

| Solution A: | Parts by weight |
|---|---|
| 2-ethylhexyl acrylate | 945.0 |
| Vinyl acetate | 525.0 |
| N-butoxymethyl acrylamide | 30.0 |
| Ethyl acetate | 1250.0 |
| Solution B: | |
| Ethyl acetate | 250 |
| Benzoyl peroxide | 15 |

Into a reactor were charged 620 parts of solution A and 50 parts of solution B. The reactor is purged with $N_2$ and refluxed with agitation. One hundred and fifty (150) parts of solution B were mixed with the remainder of solution A and added dropwise to the reactor over a 1 hour period. The remainder of solution B was then added and reaction mass was refluxed for 1½ hours more whereupon a solution containing 5 parts benzoyl peroxide and 550 parts ethyl acetate was added to the reaction mass. The reaction mass was refluxed for 1½ more hours to completion. The resulting product had the following properties:

Solids (percent) _____ 39.8
Viscosity (Gardner-Holdt) _____ $Z_4$

*Example V*

This example concerns the preparation of an adhesive composition by an emulsion technique.

| Solution A: | Parts by weight |
|---|---|
| 2-ethylhexyl acrylate | 170 |
| Vinyl acetate | 75 |
| N-butoxymethyl acrylamide | 5 |
| Solution B: | |
| Hydroxyethyl cellulose (8% aqueous Cellosize, WP-3) | 31.2 |
| Water | 250 |
| Sodium borate | 1.7 |
| Potassium persulfate | 1.0 |
| Emulsifier (Tergitol NPX 100%, alkyl-aryl polyether alcohol) | 5.0 |
| Emulsifier (Aerosol OT 100%, dioctyl ester of sodium sulfosuccinic acid) | 1.25 |

The ingredients of solution B were charged into a flask and stirred for at least 1 hour until thoroughly mixed. Twenty-five (25) parts of solution A were then added to the flask which was blown with nitrogen for 2 minutes and heated with agitation to 75° C. The remainder of solution A was then added to the flask dropwise over a period of 2 hours during which the temperature of the reaction mixture was kept between 75° C. and 80.5° C. After the addition of solution A was completed, .25 part of potassium persulfate in 10 parts of water was added to the flask and the reaction was conducted at a temperature within the same range for another hour. The resulting resinous composition had the following properties:

Viscosity (No. 4 spindle, 30 r.p.m., Brookfield viscometer), cps. _____ 1600
Total solids (percent) _____ 46.5
pH _____ 4.4

The above composition was applied to two vinyl sheets, one of which was baked for 2 minutes at 265° F., while the other was baked for 2 minutes at 300° F. Both samples had excellent initial tack and both samples manifested no interference of adhesion material when applied to a glass plate which had been heated to 300° F.

*Example VI*

| Solution A: | Parts by weight |
|---|---|
| Butyl acrylate | 292.5 |
| N-butoxymethyl acrylamide | 7.5 |
| Isopropyl acetate (approximately 4% alcohol) | 165 |
| Solution B: | |
| Isopropyl acetate | 50 |
| Benzoyl peroxide | 3 |

Eighty and two-tenths (80.2) parts of solution A and 9 parts of solution B were charged into a vessel, blown under inert gas for 10 minutes and heated with agitation at 93° C. for 10 minutes. The remainder of solution A and 27 parts of solution B were added dropwise to the reaction mass over a 65 minute period, during which time the said reaction started to reflux. After the addition was complete the remainder of solution B (17 parts) was added. Refluxing was continued for another hour and benzoyl peroxide (1 part) and isopropyl acetate (135 parts) were added over a 5 minute period. The reaction was refluxed for another hour to completion. The resulting resinous composition had the following properties:

Total solids (percent) _____ 44.8
Viscosity (Gardner-Holdt) _____ $Z_2$

The above composition was drawn down on a vinyl sheet, flashed for three minutes at 300° F., and tested. The pressure-sensitive adhesive had excellent initial tack with little transference.

Good results are obtained by substituting other N-alkoxymethyl acrylamides for the N-butoxymethyl acrylamide used in the above examples. Included among these derivatives are the methoxymethyl acrylamides, ethoxymethyl acrylamides, propoxymethyl acrylamides, isobutoxymethyl acrylamides, amyloxymethyl acrylamides and the higher alkoxymethyl acrylamides.

While specific examples of the invention have been set forth hereinabove, it is not intended that the invention be limited solely thereto, but to include all of the variations and modifications falling within the scope of the appended claims.

We claim:
1. A pressure-sensitive adhesive composition consisting essentially of an interpolymer of:
   (a) from about 40 to about 99.9 percent by weight of at least one compound of the formula:

$$CH_2=CHCOR$$
   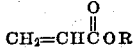

where R is an alkyl radical of from 4 to 18 carbon atoms;
   (b) up to about 60 percent by weight of at least one compound of the formula:

$$R_1COCH=CH_2$$

where $R_1$ is an alkyl radical of from 1 to 5 carbon atoms; and
   (c) from about 0.1 to about 5 percent by weight of at least one compound of the formula:

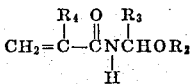
   $$CH_2=C-CNCHOR_2$$

where $R_2$ is an alkyl radical of from 1 to 5 carbon atoms, $R_3$ is a member selected from the group consisting of hydrogen, alkyl radicals of from 1 to 6 carbon atoms, and furyl, and $R_4$ is a member selected from the group consisting of hydrogen and methyl.

2. The composition of claim 1 in which R is an alkyl radical of 4 to 10 carbon atoms, $R_2$ is butyl, and $R_3$ is hydrogen.

3. The composition of claim 2 in which R is an alkyl radical of 8 carbon atoms.

4. A pressure-sensitive adhesive composition consisting essentially of an interpolymer of from about 50 to about 80 percent by weight of 2-ethyl hexyl acrylate, about 50 to about 20 percent by weight of vinyl acetate, and from about 0.1 to about 5 percent by weight of N-butoxymethyl acrylamide.

5. An adhesive composition consisting essentially of a solution of an interpolymer of:
 (a) from about 40 to about 99.9 percent by weight of at least one compound of the formula:

$$CH_2=CH\overset{\overset{O}{\|}}{C}OR$$

where R is an alkyl radical of from 4 to 18 carbon atoms;
 (b) up to about 60 percent by weight of at least one compound of the formula:

$$R_1\overset{\overset{O}{\|}}{C}OCH=CH_2$$

where $R_1$ is an alkyl radical of from 1 to 5 carbon atoms; and
 (c) from about 0.1 to about 5 percent by weight of at least one compound of the formula:

$$CH_2=\overset{\overset{R_4}{|}}{C}-\overset{\overset{O}{\|}}{C}N\overset{\overset{R_3}{|}}{\underset{H}{C}}HOR_2$$

where $R_2$ is an alkyl radical of from 1 to 5 carbon atoms, $R_3$ is a member selected from the group consisting of hydrogen, alkyl radicals of from 1 to 6 carbon atoms, and furyl, and $R_4$ is a member selected from the group consisting of hydrogen and methyl, said solution having a nonvolatile resin solids content of from about 20 to about 50 percent by weight.

6. A normally tacky and pressure-sensitive adhesive coated article comprising a backing member and, firmly adherently bonded thereto, a coating consisting essentially of an interpolymer of:

(a) from about 40 to about 99.9 percent by weight of at least one compound of the formula:

$$CH_2=CH\overset{\overset{O}{\|}}{C}OR$$

where R is an alkyl radical of from 4 to 18 carbon atoms;
 (b) up to about 60 percent by weight of at least one compound of the formula:

$$R_1\overset{\overset{O}{\|}}{C}OCH=CH_2$$

where $R_1$ is an alkyl radical of from 1 to 5 carbon atoms; and
 (c) from about 0.1 to about 5 percent by weight of at least one compound of the formula:

$$CH_2=\overset{\overset{R_4}{|}}{C}-\overset{\overset{O}{\|}}{C}N\overset{\overset{R_3}{|}}{\underset{H}{C}}HOR_2$$

where $R_2$ is an alkyl radical of from 1 to 5 carbon atoms, $R_3$ is a member selected from the group consisting of hydrogen, alkyl radicals of from 1 to 6 carbon atoms, and furyl, and $R_4$ is a member selected from the group consisting of hydrogen and methyl.

7. The article of claim 6 in which said backing member is polyvinyl chloride.

8. The article of claim 6 in which said backing member is regenerated cellulose.

9. The article of claim 6 in which said backing member is a terephthalic polyester.

10. The article of claim 6 in which said backing member is polychloroprene.

11. The article of claim 6 in which said backing member is cotton cloth.

References Cited by the Examiner

UNITED STATES PATENTS

| | | | |
|---|---|---|---|
| 2,412,475 | 12/46 | Semegen | 260—86.1 |
| 2,884,126 | 4/59 | Ulrich | 117—122 |
| 3,037,963 | 6/62 | Christenson | 260—88 |
| 3,079,434 | 2/63 | Christenson | 260—80.5 |

FOREIGN PATENTS 208,845  9/56  Australia.

JOSEPH L. SCHOFER, *Primary Examiner.*

J. R. LIBERMAN, *Examiner.*